(12) United States Patent
Bergemann et al.

(10) Patent No.: US 6,290,767 B1
(45) Date of Patent: Sep. 18, 2001

(54) CARBON BLACK

(75) Inventors: Klaus Bergemann, Erlensee; Karl Vogel, Alzenau, both of (DE)

(73) Assignee: Degussa AG, Hanau (DE)

( * ) Notice: Subject to any disclaimer, the term of this patent is extended or adjusted under 35 U.S.C. 154(b) by 0 days.

(21) Appl. No.: 09/489,469

(22) Filed: Jan. 21, 2000

Related U.S. Application Data

(60) Provisional application No. 60/117,315, filed on Jan. 26, 1999.

(51) Int. Cl.[7] .................................................. C09C 1/48
(52) U.S. Cl. ........................... 106/472; 106/473; 106/474
(58) Field of Search ................................. 106/472, 473, 106/474

(56) References Cited

U.S. PATENT DOCUMENTS

| | | | |
|---|---|---|---|
| 3,094,428 | 6/1963 | Hamilton | 106/307 |
| 3,306,762 | 2/1967 | Ruble | 106/307 |
| 3,383,175 | 5/1968 | Jordan | 23/209.4 |
| 3,448,052 | 6/1969 | Otto | 252/62.51 |
| 3,660,132 * | 5/1972 | Illigen et al. | 106/307 |

FOREIGN PATENT DOCUMENTS

96/37547  11/1996  (WO).

* cited by examiner

*Primary Examiner*—C. Melissa Koslow
(74) *Attorney, Agent, or Firm*—Smith, Gambrell & Russell, LLP

(57) ABSTRACT

Carbon blacks doped with elements that are not carbon, wherein pairs of carbon atoms have been replaced by iso-electronic pairs of elements or combinations of elements. They can be used as a pigment or filler in rubber, plastics, paints, inks or the like.

11 Claims, No Drawings

CARBON BLACK

REFERENCE TO A RELATED APPLICATION

This is a non-provisional application that claims the benefit of a provisional application No. 60/117,315 filed Jan. 26, 1999 that is relied on and incorporated by reference.

INTRODUCTION AND BACKGROUND

The present invention relates to a carbon black, its preparation and its use.

Carbon blacks are used on a large scale as a black pigment and as a reinforcing agent and filler. They are produced with different properties by various processes. Most frequent is preparation by means of oxidative pyrolysis of carbon-containing carbon black raw materials. In that process, the carbon black raw materials are burnt incompletely at high temperatures in the presence of oxygen. This class of carbon black preparation processes includes, for example, the furnace black process, the gas black process and the lamp black process. The carbon-containing carbon black raw materials used are predominantly polynuclear aromatic carbon black oils. The product stream of oxidative pyrolysis consists of a waste gas containing hydrogen and carbon monoxide and, suspended therein, finely divided carbon black, which is separated from the waste gas in a filtering installation.

In the furnace black process, incomplete combustion takes place in a reactor lined with highly refractory material. A stream of hot waste gases is produced in a pre-combustion chamber by burning a fuel/air mixture, and the carbon black raw material is sprayed or injected into that stream. The carbon black that forms is quenched by the spraying of water into the reactor and is separated from the stream of gas. The furnace carbon black process permits the preparation of carbon blacks having a very wide range of carbon black properties.

The lamp black apparatus consists of a cast-iron shell, which receives the liquid or, optionally, molten raw material, and a closed hood having a refractory lining. The air gap between the shell and the closed hood, as well as the low pressure in the system, serve to regulate the supply of air and hence to influence the properties of the carbon black. As a result of the heat radiation of the closed hood, the raw material vaporizes and is partly burnt but mainly converted into carbon black. In order to separate off the carbon black, the process gases containing carbon black are passed into a filter after cooling.

In the gas black process, the carbon black raw material is first vaporized into a hydrogen-containing carrier gas stream and then burnt in a plurality of small flames beneath a cooled roller. Some of the carbon black that forms is deposited on the roller and some is discharged with the process gases and removed in a filter.

The mentioned processes for preparing carbon black are known from Ullmanns Enzyklopädie der technischen Chemie 4. edition Volume 14 page 633 ff.

All three processes may in principle be used within the context of the invention, but preference is given to the furnace process.

It is known to dope carbon black with silicon. Carbon blacks doped with silicon are known, for example, from WO 96/37547. Silicon-containing carbon blacks can be prepared, for example, by adding silicon-containing compounds to the carbon black raw material.

It is further known to dope carbon black also with other elements (U.S. Pat. No. 3,448,052; EP 278 743 A1; EP 829 511 A1). The doping processes are similar to silicon doping.

Aggregates consisting of a carbon black phase and a metal-containing phase are known from WO 98/42778.

Also known is a process for the preparation of an intimate mixture of carbon black with oxides of the elements boron, silicon, aluminum, titanium, zirconium, zinc, lead, tin, iron, cobalt, nickel, manganese, chromium, vanadium, molybdenum, niobium and tantalum (U.S. Pat. No. 3,094,428).

There is further known a process for the preparation of carbon black by introduction of a metal compound of the group gallium, indium, aluminum or mixtures thereof (U.S. Pat. No. 3,306,762). The addition of those metal compounds, like the addition of alkali metal compounds, brings about a lowering of the structure.

Also known is a process for the preparation of carbon blacks by addition of rare earths having atomic numbers from 57 to 71 (U.S. Pat. No. 3,383,175).

An object of the present invention is to make available a carbon black having special properties such as, for example, changed shade of color, changed electrical properties, changed pH value, functional groups, sites of reaction, and improved dynamic properties in rubber. A further object is to influence the structure of the carbon black.

SUMMARY OF THE INVENTION

The above and other objects of the invention can be achieved by carbon blacks doped with elements that are not carbon, wherein pairs of carbon atoms have been replaced by isoelectronic pairs of elements or combinations of elements. The isoelectronic pairs of elements or combinations of elements can include different elements.

The carbon black can contain a combination of elements consisting of a trivalent element and a pentavalent element.

According to the invention, the carbon black can contain from 0.01 to 50 wt. % of the isoelectronic pairs of elements or combinations of elements, based on the total weight. The elements can be in a molar ratio of from 0.5/1 to 1/1.5, preferably from 0.8/1 to 1/1.2.

The carbon blacks can additionally be doped with other elements, preferably silicon.

The carbon black of the invention can contain B/N, Al/P and/or Ga/As as the combination of elements.

DETAILED DESCRIPTION OF THE INVENTION

According to the invention, the carbon black can be prepared by incorporating isoelectronic BN into the carbon of the carbon black.

According to the invention, at least two adjacent carbon atoms as a C=C unit are always replaced by an inseparable combination of elements, which are dependent on each other for the purposes of the desired doping, consisting of two isoelectronic elements, preferably of main groups III and V. They may be present in the carbon black approximately in equal proportions (with a certain tolerance). The combination is isoelectronic with C=C and forms the same structures. Thus, for example, aromatic or graphite-like structures, triple coordination and formation of double bonds may be present.

Silicon as a higher homolog of carbon is able to replace a single position of a carbon atom. Two adjacent silicon atoms therefore do not represent a combination of elements within the scope of the invention. Nor are they able to bring about an uneven charge distribution, as can be achieved by the combinations of elements of the invention.

In an embodiment of the invention of such a combination that is isoelectric with C=C, BN may be used.

Boron nitride (BN) exists in three modifications:
α-BN, analogous to graphite, hexagonal
β-BN, analogous to diamond, cubic
γ-BN, analogous to graphite, but metastable.

The unit BN is isoelectric with $C_2$. The properties of the boron nitrides are very similar to those of the carbon forms. Analogously to diamond, β-BN is very hard and is used as an abrasive. In the case of α-BN, the regular expression is "white graphite", since it is a soft modification having a layered construction, which can be used as a high-temperature lubricant. There also exist BN-analogous benzene, borazole and BN nano tubes.

The carbon black of the invention can contain a structural element according to formula I.

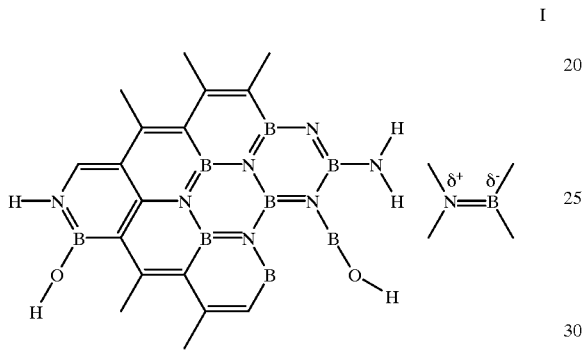

I

Although the totality of the two elements leaves neither a surplus nor a deficit of electrons in total, the electrons here are distributed unevenly within the unit. This can lead to the electron distribution in the carbon black being disturbed, with the result, for example, that the aromatic system of the carbon is disturbed and new properties are produced.

The combinations of elements may be evenly distributed in the carbon black or may be concentrated at the surface. They may be randomly distributed or may form clusters. They may form part of the carbon framework or be present separately next to the carbon structures.

The invention also provides a process for the preparation of carbon blacks, wherein compounds of the trivalent elements and compounds of the pentavalent elements are introduced into the carbon black preparation process simultaneously, optionally with the addition of other, preferably silicon-containing, compounds.

The compounds may be injected into the carbon black formation zone separately or in admixture with the oil. The compounds may be introduced into the reactor individually or in pre-mixed form. For example, boric acid trimethyl ester and triethylamine can be injected into the reactor simultaneously.

For example, for the purposes of doping with the elements boron and nitrogen, boron oxide, boric acid and/or borax may be added to the carbon black raw material with urea, melamine, ammonium chloride and/or ammonia.

Both the elements may be contained in one compound. For example, boron nitride itself can be mixed in to the carbon black raw material.

Other processes based on boron halides and ammonia derivatives can be used.

In principle it may be expedient to mix the doping components, preferably B and N components, before they are injected into the reactor, in order to bring them together at that stage in the desired manner (chemically via Lewis acid/base reaction).

The doping of carbon black with isoelectronic pairs of elements or combinations of elements can bring about the following effects:

(a) a change in color

For special applications it may be valuable to use a carbon black having a particular shade of color. For example, carbon blacks having a bluish cast are often preferred for printing inks. In grey paints, shades of color of the carbon black can often clearly be seen, and in that case, for example, shades of color other than blue may be desired.

(b) effect on the structure of the carbon black

The structure of the carbon black is an expression of the size of the aggregates formed from the primary particles. It is known to lower the structure by the addition of metal cations, mostly potassium ions. It is also known that the structure can be increased by longer dwell times. Increasing the dwell time of the reactants in the reactor leads to a reduction in the carbon black throughput and to a mostly undesirable broadening of the particle size distribution.

According to the invention, the structure can be increased by doping without lowering the throughput and/or broadening the particle size distribution.

As a result of the carbon black doping of the invention, alkali-metal-containing carbon black raw materials can be used for the preparation of carbon black without the resulting carbon black having a lowered structure under the effect of the structure-lowering alkali metal. The lowering of the structure by the alkali metal is counteracted by, for example, BN doping.

(c) changed electrical properties in dependence on the amount of BN added (conductor, semiconductor)

(d) by partial hydrolysis of the isoelectronic elements with the quenching water it is possible to produce functionalities which provide new carbon black properties directly or act as a site of reaction for further chemical modifications.

While the non-polar CC bonds are scarcely affected by water, the polar bonds between the different elements within the isoelectronic combination of elements used for doping are more readily hydrolysable. The resulting groups such as, for example, —$NH_2$ or B—OH are more reactive than C—H bonds and may enter into secondary reactions in the case of chemical after-treatment.

(e) even without hydrolysis, more sites of reaction are formed.

The disturbance of the carbon framework by adjacent doping elements can cause increased reactivity in the form of activated bonds, disorders, polarisations, etc. both at the carbon atoms and at the foreign elements.

(f) as a result of the doping, the dynamic properties of rubber mixtures containing doped carbon black are improved, in particular the tan δ60° C. value is reduced.

(g) change in the pH value without after-treatment

Furnace carbon blacks frequently have pH values in the markedly basic range. The pH value can be lowered by the incorporation of foreign elements.

In another embodiment of the invention there may be added to the carbon black raw material appropriate compounds of main group III and compounds of main group V of the periodic system of the elements that are not B/N.

Examples thereof may be the addition of trimethylgallium, triethylaluminum or trimethylindium and arsenic trihydride, respectively, phosphane and their organic derivatives such as, for example, trimethylarsine or triphenylphosphane.

The carbon blacks of the invention may have, for example, at the B- or N-containing sites functional groups resulting directly from the doping or from the partial hydrolysis or solvolysis of BN in the carbon black.

The carbon blacks of the invention can be modified using known after-treatment methods. They can be subjected to after-oxidation, chemically modified, doped with other elements as a synergistic component. Doping can be carried out with silicon by known methods.

The carbon blacks of the invention are used as a pigment or filler in rubber, plastic, paint, printing inks or the like. The use of the carbon black of the invention in a rubber mixture can bring about a tan $\delta 60°$ C. reduction and/or a tan $\delta 0°$ C. increase.

The carbon blacks of the invention can be used in caoutchouc mixtures.

The carbon blacks of the invention can be used in the production of moulded bodies, especially pneumatic tires, tire treads, cable sheaths, hoses, driving belts, conveyor belts, roller coverings, shoe soles, seals, profile sections and insulating elements.

EXAMPLES

Example 1

BN-doped Carbon Black in a Rubber Mixture for Use for Tires

160 Nm³/h of combustion air, 10.8 Nm³/h of fuel (natural gas) and a mixture of 30 kg/h of carbon black oil, 450 g/h of BN powder, 3608 g/h of glycerol and 750 g/h of water are injected into a furnace reactor, the suspension of the BN powder in glycerol and water being prepared first and being mixed with the carbon black oil via a Y-piece and a static mixer. The doped carbon black B1 that forms is separated off and compacted. The resulting carbon black B1 contains 0.93 wt. % of boron and 1.4 wt. % of nitrogen.

160 Nm³/h of combustion air, 10.8 Nm³/h of fuel (natural gas) and 34 kg/h of carbon black oil are injected into the same furnace reactor. The undoped comparison carbon black C1 that forms is separated off and compacted.

The carbon black B1 and the comparison carbon black C1 are used to produce rubber mixtures. The viscoelastic properties inter alia of the rubber mixtures are determined.

The viscoelastic properties of the rubber mixtures reinforced with those carbon blacks are determined according to DIN 53513. In particular, the loss factors tan $\delta$ at 0° C. and at 60° C. are determined. The test recipe used for the rubber mixtures is given in Table 1.

TABLE 1

SSBR/BR test recipe

| Mixing component | Content [phr] |
|---|---|
| SSBR | 96.0 |
| BR | 30.0 |
| carbon black | 80.0 |
| ZnO RS | 3.0 |
| stearic acid | 2.0 |

TABLE 1-continued

SSBR/BR test recipe

| Mixing component | Content [phr] |
|---|---|
| aromatic oil | 10.0 |
| 6 PPD | 1.5 |
| wax | 1.0 |
| CBS | 1.5 |
| DPG | 2.0 |
| TBZTD | 0.2 |
| sulfur | 1.5 |

The SSBR caoutchouc component is an SBR copolymer polymerised in solution having a styrene content of 25 wt. % and a butadiene content of 75 wt. %. The vinyl content of the butadiene is 67%. The copolymer contains 37.5 phr of oil and is marketed under the trade name Buna VSL 5025-1 by Bayer AG. Its Mooney viscosity (ML 1+4/100° C.) is approximately 50.

The BR caoutchouc component is a cis-1,4-polybutadiene (neo-dymium type) having a cis-1,4 content of at least 96 wt. %, a trans-1,4 content of 2 wt. %, a 1,2 content of 1 wt. % and a Mooney viscosity of 44±5. That component is marketed under the trade name Buna CB 24 by Bayer AG.

The aromatic oil used is Naftolen ZD from Chemetall. The PPD content of the test recipe was Vulkanox 4020 and the CBS content was Vulkacit CZ, the DPG was Vulkacit D and the TBZTD was Perkacit TBZTD, all from Bayer AG. The wax used is Protector G35 from HB-Fuller GmbH.

The carbon blacks are incorporated into the rubber mixture in three stages in accordance with the following Tables (Tables 2 to 4):

TABLE 2

Stage 1

| Settings | |
|---|---|
| Mixing unit | 350S mixing chamber, Brabender |
| Friction | 1:1.11 |
| Speed | 70 min⁻¹ |
| Ram pressure | 5.5 bar |
| Empty volume | 0.39 l |
| Degree ot filling | 0.70 |
| Flow temperature | 80° C. |
| Mixing operation | |
| 0 to 1 min | Buna VSL 5025-1 + Buna CB 24 |
| 1 to 3 min | ½ carbon black + ZnO RS + stearic |
| 3 to 4 min | acid + Naftolen ZD + optionally Si69 |
|  | ½ carbon black, Vulkanox 4020 + Protector G35 |
| 4 min | clean |
| 4 to 5 min | mix |
| 5 min | clean |
| 5 to 6 min | mix and complete the operation |
| batch temperature | 150–155° C. |
| storage | 24 hours at room temperature |

TABLE 3

Stage 2

| Settings | |
|---|---|
| Mixing unit | as in Stage 1 except for |
| Degree of filling | 0.68 |
| Speed | 80 min⁻¹ |

TABLE 3-continued

Stage 2

| Mixing operation | |
|---|---|
| 0 to 2 min | break up batch from Stage 1 |
| 2 to 5 min | maintain batch temperature of 155° C. by varying the speed |
| 5 min | complete the operation |
| batch temperature | 155° C. |
| storage | 4 h/RT |

TABLE 4

Stage 3

| Settings | |
|---|---|
| Mixing unit | as in Stage 1 except for |
| Degree of filling | 0.66 |
| Flow temperature | 50° C. |
| Speed | 40 min$^{-1}$ |
| Mixing operation | |
| 0 to 2 min | batch from Stage 2 + Vulkacit CZ + Vulkacit D and Perkacit TBZTD + sulfur |
| 2 min | complete the operation and form sheet on set of laboratory mixing rollers (Troester WNU1, diameter 100 mm, length 250 mm, flow temperature 50° C.) For homogenisation then: separate 3 × left and 3 × right and turn over and turn 8 × with a narrow roller gap (0.3 mm) and 3 × with a wide roller gap (3.5 mm) and then draw sheet out |

The subsequent determination of the rubber properties Shore hardness and loss factor tan δ at 0 and 60° C. is carried out according to the mentioned standards. The measuring conditions for the viscoelastic properties are given in Table 5.

TABLE 5

Determination of the viscoelastic properties according to DIN 53513

| Vulcanization of the specimens | |
|---|---|
| Vulcanization temperature | 165° C. |
| Vulcanization time | T95 + 5 min (T95: DIN 53529) |
| Form of specimens | |
| Shape | cylindrical |
| Length | 10 mm |
| Diameter | 10 mm |
| Number | |
| Testing machine | |
| Type/Manufacturer | 830/MTS |
| Type of loading | elongation |
| Mean force amplitude | 50 N |
| Dynamic forde amplitude | ±25 N |
| Test frequency | 16 Hz |
| Test sequence | tempering for 5 min then dynamic loading at 16 Hz for 2 min, followed by measuring |

TABLE 6

Results of the rubber tests

| Filler | CTAB ASTM D-3765 m$^2$/g | DBP ASTM D-2414 ml/100 g | Shore A DIN 53505 | tanσ0 DIN 53513 | tanσ60 DIN 53513 |
|---|---|---|---|---|---|
| C1 | 103 | 112 | 65 | 0.501 | 0.273 |
| B1 | 104 | 117 | 67 | 0.508 | 0.255 |

As compared with the comparison carbon black C1, the carbon black B1 of the invention confers on the rubber mixture a loss factor at 60° C. that is reduced by 6.6% and a loss factor at 0° C. that is increased by 1.4%. Tires produced from such rubber mixtures are to be expected to have improved slipping behavior when wet while at the same time having reduced rolling resistance.

Example 2

Influencing the Structure of Carbon Black by Doping with BN

160 Nm$^3$/h of combustion air, 10.8 Nm$^3$/h of fuel (natural gas) and a mixture of 30 kg/h of carbon black oil, 450 g/h of BN powder, 3608 g/h of glycerol and 750 g/h of water are injected into a furnace reactor, the suspension of the BN powder in glycerol and water being prepared first and being mixed with the carbon black oil via a Y-piece and a static mixer. At the same time, the structure is prevented from becoming indefinitely high by the injection of 1 l/h of potash solution, the concentration of which is defined by the conductivity of 140 µS. The doped carbon black B2 that forms is separated off in the uncompacted state. The resulting carbon black B2 contains 0.93 wt. % of boron and 1.4 wt. % of nitrogen.

Under the same conditions, an undoped carbon black is prepared simply by omitting the BN powder and is separated off in the uncompacted state as comparison carbon black C2.

The structure of the carbon black B2 and the comparison carbon black C2 is determined. Determination of the structure by means of DBP absorption is carried out according to ASTM D-2414.

The BN-doped carbon black B2 has a DBP absorption of 124.4 ml/100 g with a CTAB of 103.6 m$^2$/g, the undoped carbon black C2 has a DBP of only 97.1 ml/100 g with a CTAB of 103.3 m$^2$/g. Doping with boron and nitrogen increases the structure by 28%.

Example 3

Effect of the BN Doping on the Shade of Color of the Carbon Black

160 Nm$^3$/h of combustion air, 10.8 Nm$^3$/h of fuel (natural gas) and a mixture of 30 kg/h of carbon black oil, 450 g/h of BN powder, 3608 g/h of glycerol and 750 g/h of water are injected into a furnace reactor, the suspension of the BN powder in glycerol and water being prepared first and being mixed with the carbon black oil via a Y-piece and a static mixer. The doped carbon black B2 that forms is separated off in the uncompacted state. The resulting carbon black B2 contains 0.93 wt. % of boron and 1.4 wt. % of nitrogen. It has a DBP absorption of 124.4 ml/100 g and a CTAB absorption of 103.6 m$^2$/g.

160 Nm$^3$/h of combustion air, 10.8 Nm$^3$/h of fuel (natural gas) and a mixture of 30 kg/h of carbon black oil, 150 g/h of BN powder, 3608 g/h of glycerol and 750 g/h of water are injected into a furnace reactor, the suspension of the BN powder in glycerol and water being prepared first and being mixed with the carbon black oil via a Y-piece and a static mixer. The doped carbon black B3 that forms is separated off in the uncompacted state. The resulting carbon black B3 contains 0.35 wt. % of boron and 0.75 wt. % of nitrogen. It has a DBP absorption of 115.3 ml/100 g and a CTAB of 105.2 m²/g.

160 Nm³/h of combustion air, 10.8 Nm³/h of fuel (natural gas) and 34 kg/h of carbon black oil are injected into the furnace reactor. The undoped comparison carbon black C3 that forms is separated off in the uncompacted state. The carbon black C3 has a DBP absorption of 115.2 ml/100 g and a CTAB absorption of 103 m²/g.

160 Nm³/h of combustion air, 10.8 Nm³/h of fuel (natural gas) and a mixture of 33 kg/h of carbon black oil, 3608 g/h of glycerol and 750 g/h of water are injected into a furnace reactor, the mixture of glycerol and water being prepared first and being mixed with the carbon black oil via a Y-piece and a static mixer. The undoped carbon black C4 that forms is separated off in the uncompacted state. The carbon black C4 has a DBP absorption of 98.2 ml/100 g and a CTAB absorption of 100.2 m²/g.

The color of a body can be illustrated in diagrams or color systems. Such a system is the CIELAB system. Further details are described in Hansl Loos: "Farbmessung", Verlag Beruf+Schule, Itzehoe 1989 page 103 onwards. The shades of color are mapped in a circular diagram. The shade of color of a body can be described by giving coordinates or angles. The angular value h in ° is a parameter for the shade of color (blue, yellow, red, green). It is given counterclockwise starting from the +a* axis. Further descriptions will also be found in Hans G. Völz: Industrielle Farbprüfung, VCH, Weinheim 1990 page 23 ff.

The carbon blacks are incorporated into an alkyd melamine resin stoving lacquer. 4.3 parts of dried carbon black are added to a lacquer consisting of 23.4 parts of Maprenal MF 800 (55% strength), 50.3 parts of Alkydal F 310 (60% strength) and 22 parts of xylene-based diluent. The carbon black is dispersed by means of 7×the weight of steel balls in a beaker on a Skandex mixer BA-S 20 for 30 minutes. The balls are subsequently separated from the lacquer again. The carbon-black-containing lacquer is applied to a cleaned glass plate 6×10 cm in size by means of a coating roller system (90 μm). After exposure to air, the samples are baked for 30 minutes in a drying cabinet at 130° C.

The coloristic data are determined using a PAUSCH Q-COLOR 35 measuring device and the software WIN-QC.

The undoped carbon blacks C3 and C4 exhibit values for h of 16.2° and 14.6°, respectively, and therefore lie in the yellowish red direction, while the doped carbon blacks B3 and B2 exhibit values for h of 355.8° and 341.9°, respectively, and thus lie in the bluish red direction. Doping with boron and nitrogen therefore changes the shade of color of the resulting carbon blacks.

Example 4

Doping of a Carbon Black with Boron and Nitrogen by Injecting a Compound Containing Only Boron and a Compound Containing Only Nitrogen into the Reactor Together 160 Nm³/h of combustion air, 10.8 Nm³/h of fuel (natural gas) and a mixture of 29 kg/h of carbon black oil, 935 g/h of boric acid in 3608 g/h of glycerol and 1815 g/h of urea in 750 g/h of water are injected into a furnace reactor. The two doping components and the two solvents ultimately form a homogeneous solution, which is then mixed in via a Y-piece and a static mixer. Although B and N are ultimately to be incorporated into the carbon black in approximately equal molar proportions, the nitrogen-containing starting material is used in excess as compared with the B component. The doped carbon black B4 that forms is separated off in the uncompacted state. The resulting carbon black B4 contains 0.15 wt. % of boron and 0.3 wt. % of nitrogen.

Example 5

Changing the pH Value by Doping with Boron and Nitrogen

The pH value of carbon blacks is determined according to DIN EN ISO 787-9.

The comparison carbon blacks C3 and C4 described in the preceding Examples have pH values of 8.4 and 8.6, respectively. The doped carbon blacks B2, B3 and B4 have pH values of 7.3, 7.6 and 7.4, respectively. By means of doping it is possible to lower the pH value of the carbon blacks by one pH unit.

The carbon-black-analytical characteristic data of the carbon blacks prepared and of the carbon blacks in application systems are determined for all Examples by the following methods (Table 7):

TABLE 7

Methods of analysis

| Parameter | Method |
|---|---|
| DBP absorption | ASTM D-2414 |
| Elemental analysis C, N | CARLO ERBA CE 1108 |
| Elemental analysis B | Ashing in a HPA-F Anton Paar high-pressure ashing device, decomposition of the melt in NaOH and Na2O2, analysis with ICP Optima 3300DV Perkin-Elmer |
| CTAB | ASTM D-3765 |
| pH value | DIN EN ISO 787-9 |
| Shade of color value h | DIN 5033; PAUSCH Q-COLOR 35 with WIN-QC |
| Viscoelastic properties of the rubber mixtures (tan δ) | DIN 53513 |
| Shore hardness | DIN 53505 |

Further variation and modifications of the foregoing will be apparent to those skilled in the art after reading this application and are intended to be encompassed by the claims appended hereto.

We claim:

1. A carbon black, doped so that at least one pair of carbon atoms is replaced by an isoelectronic pair of atoms comprising a trivalent element and a pentavalent element.

2. The carbon black according to claim 1, wherein the carbon black is comprised of from 0.01 to 50 wt. % of the isoelectronic pairs of elements, based on the total weight.

3. The carbon black according to claim 1, wherein the isoelectronic pairs of elements are in a ratio of from 0.5/1 to 1/1.5.

4. The carbon black according to claim 1, wherein the carbon black is further doped with another element.

5. A process for the preparation of the carbon black according to claim 1, comprising introducing a compound of the trivalent element and a compound of the pentavalent element into a carbon black preparation process simultaneously, optionally with the addition of other compounds.

6. The process according to claim 5, wherein a silicon compound is also introduced.

7. A rubber, plastic, paint, ink or printing ink composition containing the carbon black of claim 1.

8. A process of reducing a tan $\delta 60°$ value of a rubber mixture, or of increasing a tan $\delta 0°$ C. value of a rubber mixture, comprising incorporating the carbon black of claim 1 into the rubber mixture.

9. The carbon black according to claim 1, wherein the isoelectonic pair of atoms comprises boron nitride.

10. The carbon black according to claim 1, wherein the isoelectonic pair of atoms comprises gallium arsenide.

11. The carbon black according to claim 1, wherein the isoelectonic pair of atoms comprises aluminum phosphide.

\* \* \* \* \*